(12) United States Patent
McGee et al.

(10) Patent No.: US 7,639,624 B2
(45) Date of Patent: Dec. 29, 2009

(54) METHOD AND SYSTEM FOR MONITORING NETWORK CONNECTIVITY

(75) Inventors: Michel Sean McGee, Round Rock, TX (US); Michael Sean McIntyre, Austin, TX (US); Mark Christopher Stratton, Georgetown, TX (US); Christopher L. Hughes, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 815 days.

(21) Appl. No.: 10/898,399

(22) Filed: Jul. 23, 2004

(65) Prior Publication Data

US 2006/0018263 A1    Jan. 26, 2006

(51) Int. Cl.
   *G01R 31/08* (2006.01)
(52) U.S. Cl. .................................. 370/248; 370/245
(58) Field of Classification Search ......... 370/241–242, 370/245, 248–249
   See application file for complete search history.

(56) References Cited

U.S. PATENT DOCUMENTS

| | | | |
|---|---|---|---|
| 6,049,825 A * | 4/2000 | Yamamoto | 709/221 |
| 6,229,538 B1 | 5/2001 | McIntyre et al. | |
| 6,272,113 B1 * | 8/2001 | McIntyre et al. | 370/248 |
| 6,560,630 B1 * | 5/2003 | Vepa et al. | 718/105 |
| 6,763,479 B1 * | 7/2004 | Hebert | 714/4 |
| 2002/0161867 A1 * | 10/2002 | Cochran et al. | 709/221 |
| 2005/0132030 A1 * | 6/2005 | Hopen et al. | 709/223 |

* cited by examiner

*Primary Examiner*—Kwang B Yao
*Assistant Examiner*—Tung Q Tran

(57) ABSTRACT

A method for monitoring network connectivity. The method may include the act of transmitting a respective request packet from a network interface card (NIC) of a plurality of NICs in a NIC team to an external network device. The method may also include the act of receiving a respective response packet from the external network device at each respective NIC from which a respective request packet was received by the external network device.

22 Claims, 6 Drawing Sheets

METHOD AND SYSTEM FOR MONITORING NETWORK CONNECTIVITY

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Typical computer networks may include a variety of devices serving different functions. As one example, computer networks typically include one or more servers that provide connectivity and shared resources to users of the network. Servers typically connect to the network via network interface cards (NICs) that facilitate communication with the network by wire and/or wireless mediums. To improve throughput and to provide some degree of fault tolerance, a server may be equipped with more than one NIC connected to the network.

If multiple NICs are present within a server, it may be desirable to coordinate their operation or to handle them as one virtual or logical NIC. For example, multiple NICs within a server may be coordinated to function as a single virtual NIC, i.e., as a NIC team. In such a NIC team, each member of the NIC team is separately connected to the network, but the operating system and clients of the network generally see the NIC team as a single NIC interface having one hardware and one protocol address. As long as connectivity is maintained throughout the network, it is generally irrelevant to what devices, such as switches, hubs, bridges, routers, concentrators, etc., the different NICs of the NIC team are connected.

However, connectivity failures between devices on a network may result in members of the NIC team being on separate network segments from one another. For example, a physical line disruption or a misconfiguration of a switch may result in different NICs of the NIC team being connected to separate network segments. In such a case, connectivity to the server may be lost for some clients, with those clients on a network segment connected through the primary NIC of the NIC team continuing to see the server while those clients on other network segments lose connectivity. To the extent that the clients retaining connectivity may not represent the highest priority clients or the majority of clients, the effects of the connectivity failure may be exacerbated. Typically, recovery from such a disruption involves administrator intervention, i.e., manual reconfiguration of the NIC team, which may result in undesirable down time of network resources for priority clients.

DETAILED DESCRIPTION OF SPECIFIC EMBODIMENTS

As discussed below, certain embodiments of the present invention comprise a technique for monitoring network connectivity for a server employing one or more NIC teams. The technique provides for testing each member of the NIC team for connectivity to an external network device. If the primary NIC of the NIC team is not connected to the external network device but one or more of the secondary NICs is connected, one of the connected secondary NICs is designated the new primary NIC and the previous primary NIC is designated as a secondary NIC. In this manner, connectivity is maintained with the network segment containing the external network device. In addition, members of the NIC team that are determined not to have connectivity to the external network device may be flagged to indicate the lack of connectivity, thus allowing traffic load balancing or other load management techniques to allocate network traffic properly. Notification of connection failures and failover events may also be provided to an administrator or operator.

Figure 1:
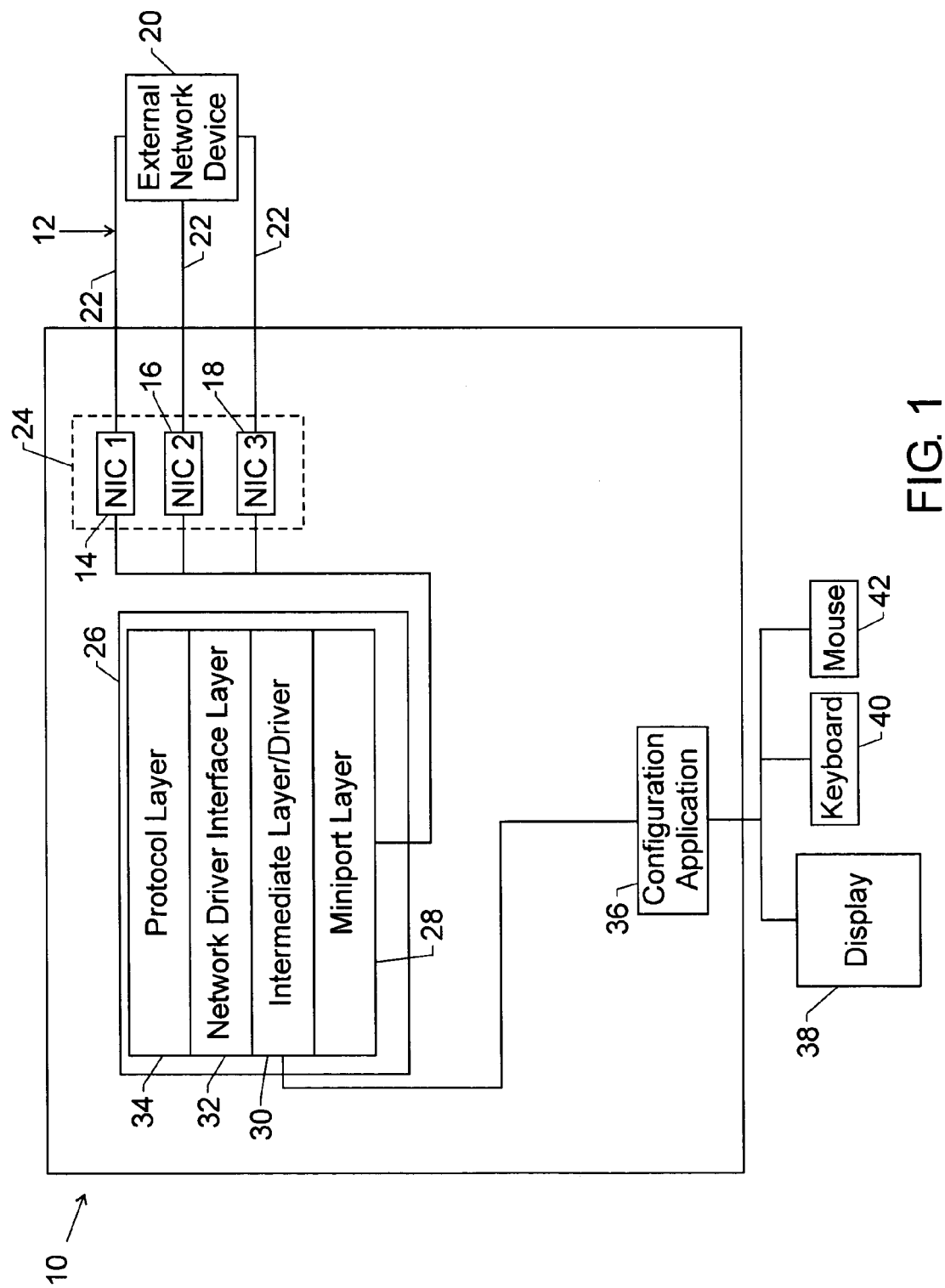
FIG. 1 is a block diagram depicting a computer system employing a NIC team, in accordance with aspects of the present invention.

Turning to the figures, FIG. 1 depicts a block diagram of an exemplary computer system 10 that may be used to implement various aspects of the present technique on a computer network. In particular, the exemplary computer system 10 may be a server configured to provide access to network resources to clients of a network 12. The computer system 10 may be equipped with more than one network interface card (NIC), with each NIC typically being inserted in an expansion slot, such as a PCI slot, of the system motherboard. A NIC may connect to the network 12 via a wire or wireless medium. For the purpose of illustration, the computer system 10 is depicted as being equipped with three such NICs, NIC 1 (14), NIC 2 (16), and NIC 3 (18), each of which provide a connection to the network 12.

Each NIC enables the computer system 10 to communicate with other devices on the network 12, such as with the external network device 20. When two or more NICs are connected to a common network 12, as depicted in FIG. 1, each NIC provides a separate and redundant link 22 to the network 12, which may be exploited to provide fault tolerance and/or load balancing. For example, for load balancing implementations, the computer system 10 may distribute data among the links 22 to the network 12 according to one or more desired criteria to achieve data throughput consistent with the criteria. As will be appreciated by those of ordinary skill in the art, load balancing implementations may include transmit load balancing or switch-assisted load balancing.

To facilitate these fault tolerance and/or load balancing implementations, the NICs 14, 16, 18 may be operated as a NIC team 24. The NIC team 24 operates like a single virtual or logical device, i.e., as a single NIC, which is known on the network by a single protocol address, such as an internet protocol (IP) address, and by a single media access control (MAC) address. Packets directed to the NIC team addresses are routed to a designated NIC of the NIC team 24, typically known as the primary NIC. Conversely, non-primary NICs, known as secondary NICs, typically don't have a associated IP addresses so that packets are not routed to them, however, they do have associated MAC addresses The formation and operation of the NIC team 24 may be accomplished by inclusion of a suitable layer or driver within the operating system (OS) 26 running on the computer system 10. The included layer or driver then may function as an intermediary, translating commands or instructions typically addressed to a single NIC so that the commands or instructions are instead executed by the one or more members of the NIC team 24.

For example, the OS 26 may be a network OS, such as MICROSOFT WINDOWS NT®, MICROSOFT WINDOWS® 2003, or Novell NETWARE®, installed on a server. Such an OS 26 typically includes code supporting the use of one or more communication protocols, such as TCP/IP, IPX, NetBEUI, etc., which may be used to communicate with other devices and/or OSs on the network. This support may be implemented in the OS 26 via a hierarchy of communication or protocol layers, in which each layer typically facilitates communication with the adjacent layers. For example, these layers may include a miniport layer 28 upon which network adapter drivers, i.e., NIC drivers, reside. As will be appreciated by those of ordinary skill in the art, the NIC drivers control the hardware associated with the individual NICs 14, 16, 18.

In implementations employing NIC teaming, an intermediate layer or driver 30, such as a teaming driver, may also be present. Unlike the NIC drivers of the miniport layer 28, the intermediate driver 30 does not directly control a piece of hardware. Instead, the intermediate driver 30 provides special functionality in a layer between the miniport layer 28 and the protocol layer of the OS 26. For example, to support NIC teaming, the intermediate driver 30 may coordinate the function and communications of the NIC drivers of the miniport layer 28 so that they appear as a single virtual NIC to higher layers of the OS 26. By means of the intermediate driver 30, commands or communication to this virtual NIC may be parsed by the intermediate driver 30 and sent to a particular NIC 12, 14, 16 of the NIC team 24 via the appropriate NIC driver. The intermediate driver 30 may also provide special functionality for determining the connectivity status of members of NIC team 24 by causing the transmission of one or more types of status requests and receipts, e.g., heartbeats, as described in detail below.

The intermediate driver 30 may also communicate with a network driver interface layer 32, such as an implementation of Microsoft's network driver interface specification (NDIS). The network driver interface layer 32 typically handles communication between the underlying layer, i.e., the intermediate driver 30, and the protocol layer 34. The protocol layer 34 may, among other functions, provide IP or IPX addresses for outbound network traffic. In addition, for networks adhering to the open system interconnection (OSI) model, the protocol layer 34 translates layer 3 addresses (protocol addresses such as IP or IPX addresses) to layer 2 addresses (hardware addresses such as MAC addresses) to insure that data packets are directed to the appropriate network hardware. For example, in an OSI network employing an IP protocol, the protocol layer 34 translates IP addresses to which data packets are addressed to the appropriate media access control (MAC) addresses, e.g., hardware addresses, such that data is routed to the desired network device in a suitable packet format. As will be appreciated by those of ordinary skill in the art, a communication or protocol stack, as described above, allows communication between applications running on the computer system 10 and other network devices via the NIC team 24.

In addition, the computer system 10 may include a configuration application 36 that allows an operator to interface with the intermediate driver 30. In particular, the operator may interface with the configuration application via an output device, such as a display 38, and one or more input devices, such as a keyboard 40 and/or mouse 42. An operator may use the configuration application 36 to assign NICs to the NIC team 24 and/or to designate a mode of operation for the NIC team 24, such as a fault tolerant mode or a load balancing mode.

Figure 2:
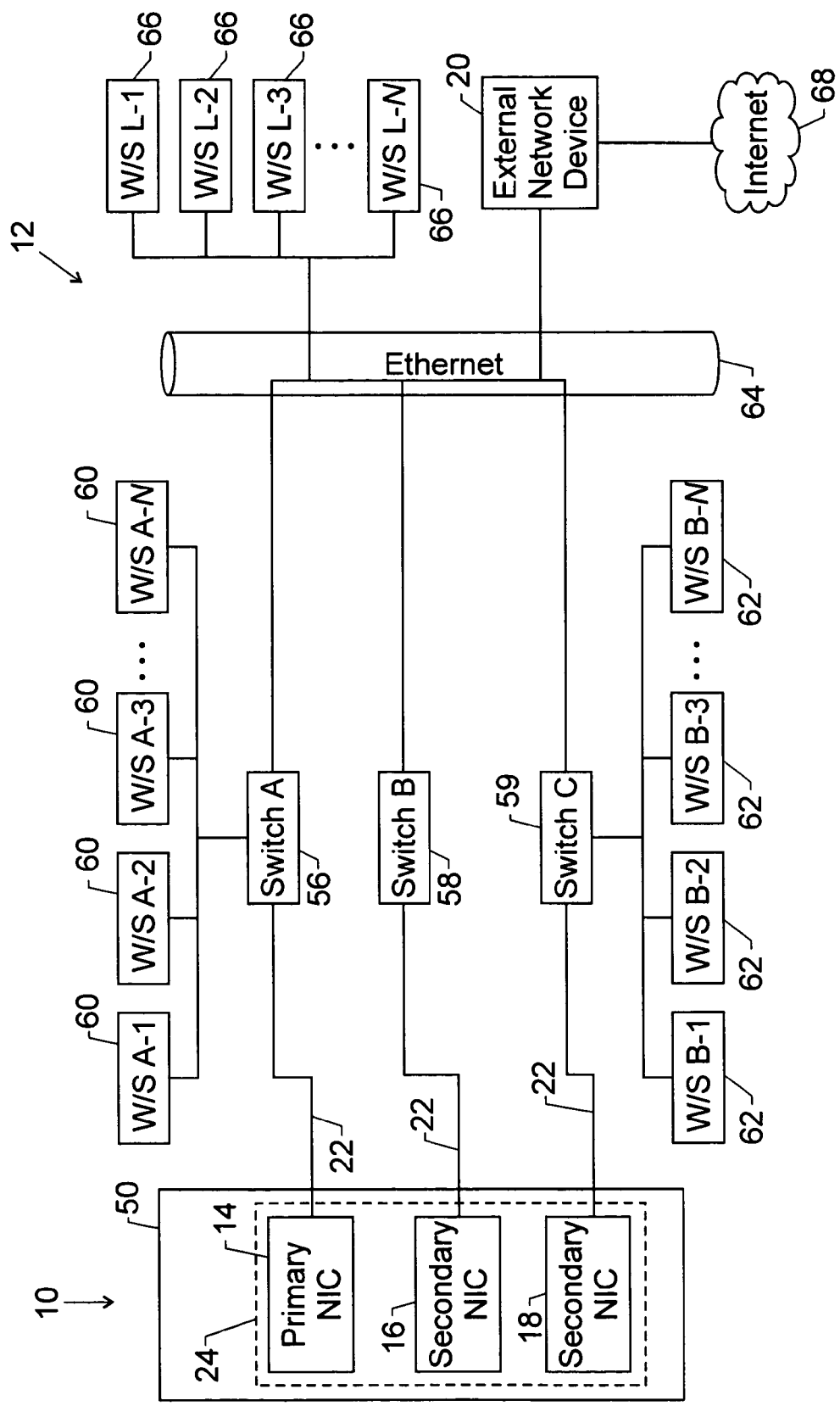
FIG. 2 is a block diagram depicting an exemplary computer network, in accordance with aspects of the present invention.

Referring now to FIG. 2, an exemplary network 12 incorporating an exemplary computer system 10, depicted herein as a server 50, is provided. The server 50 may include a NIC team 24 in which one NIC 14 may be designated as the primary NIC while the remainder of the NICs 16 and 18 are designated as secondary NICs. As noted above, the NIC team 24 functions as a single virtual NIC in which communication from the network 12 may primarily be routed through the primary NIC 14. Depending on the NIC team mode, the secondary NICs 16 and 18 may be relatively inactive. For example, in a fault tolerant mode, the secondary NICs 16 and 18 are idle and only transmit and receive heartbeats, as described below. The primary NIC 14, however, may transmit and receive other network traffic as well as heartbeats. Alternatively, in a transmission load-balancing mode, the secondary NICs 16 and 18 may transmit load balanced network traffic but do not receive any data traffic as such traffic is routed to the NIC team IP address, and thereby to the primary NIC.

Typically the primary NIC 14 and secondary NICs 16 and 18 connect to the network via respective links 22, such as wire or wireless connections, to respective switch A 56, switch B 58 and switch C 59. As depicted, switch A 56 and switch C 59 may connect to respective sets of workstations 60 and 62, as well as to other network media, such as to the Ethernet backbone 64. In this manner, the various clients, servers, and other network devices of the network 12 may be connected via a wired or wireless media, allowing communication between clients and servers and the sharing of network resources.

The connectivity of the members of the NIC team 24 to the network 12 may be monitored using layer 2 heartbeats that are transmitted to and received by the members of the network team 24. Typically, the layer 2 heartbeat frames include only a MAC address, e.g., the hardware address of another NIC of the NIC team 24, and no IP or IPX address, hence the designation as a layer 2 heartbeat. Transmission and reception of the layer 2 heartbeat frames are indicative of a network connection existing between the respective NIC team members. Conversely the inability to transmit or receive heartbeat frames between two NIC team members indicates the absence of a network connection between the two NIC team members.

Figure 3:
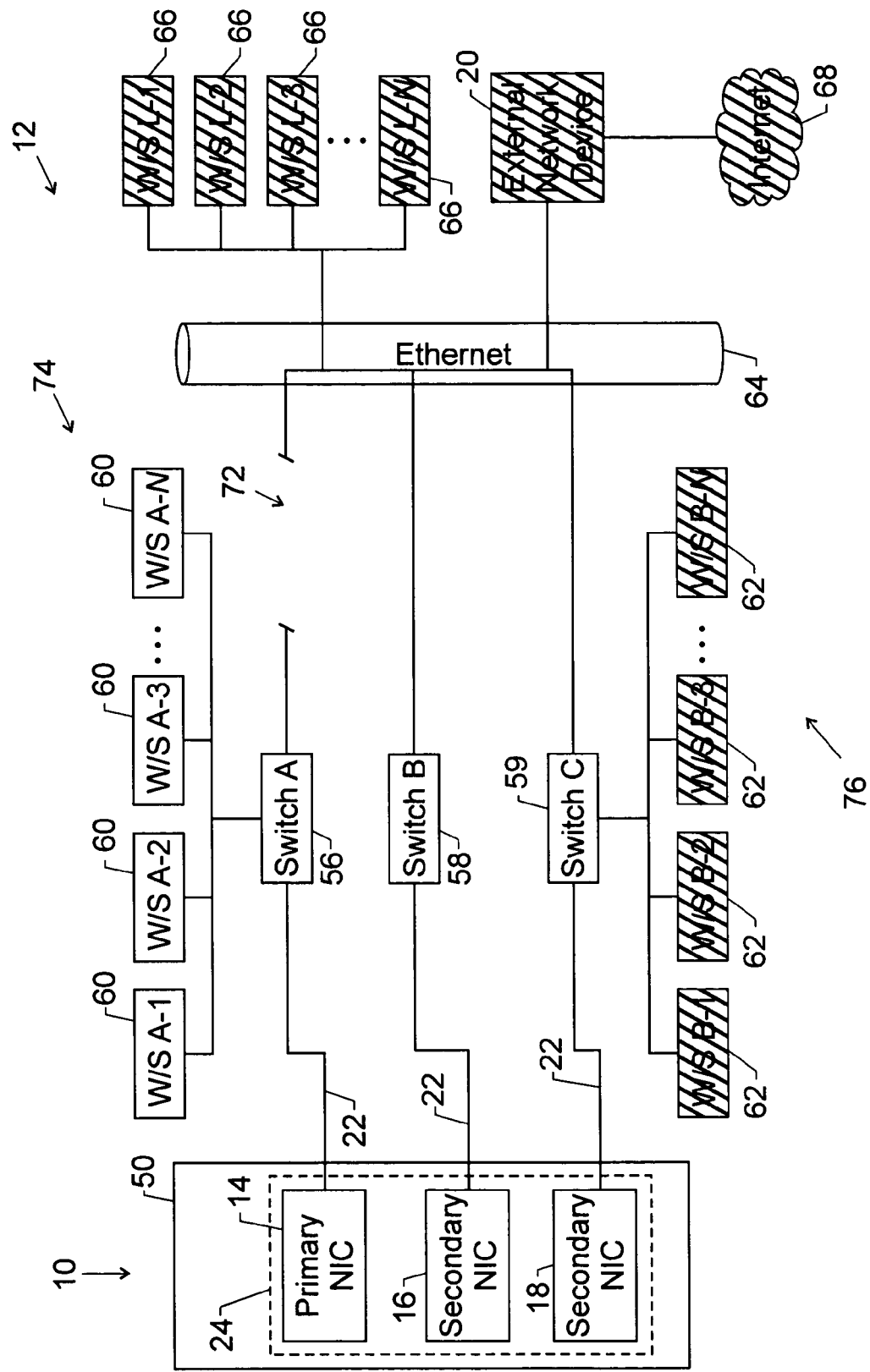
FIG. 3 is a block diagram depicting the exemplary computer network of FIG. 2 undergoing a connection disruption.

As may be appreciated from this description of the network 12 and NIC team 24, a failure scenario may occur if there is a break in connectivity on the network 12 between the NICs, such as due to a physical line break, disruption of a wireless signal, or misconfiguration of a setting on a network device, such as switch A 56, switch B 58, or switch C 59. In such a failure scenario, as depicted in FIG. 3, the primary NIC 14 and one or more of the secondary NICs 16 and 18 may end up on separate layer 2 networks, herein described as distinct network segments. In such a failure scenario, the layer 2 heartbeats discussed above would not cross between network segments, resulting in an indication that respective members of the NIC team 24 were no longer connected. The distinct network segments thereby created, therefore, would not all remain active.

For example, the connectivity break 72 may effectively create an active network segment 74 connected to the NIC team 24 via the designated primary NIC 14. However, one or more inactive network segments 76 may also be created that are unable to communicate with the NIC team 24 because they are connected through one or more secondary NICs 16 and 18 that are isolated from the primary NIC 14 by the connectivity break 72. In such a scenario, connectivity to the server 50 may be lost for those clients connected to the inactive network segment 76. Based on where the connectivity break 72 occurs, the clients retaining connectivity with the server 50, i.e., the clients on the active network segment 74, may not be the majority of clients on the network 12 or may not represent the most important connections, such as external connections to the internet 68.

Unfortunately, existing techniques utilizing layer 2 heartbeats are not helpful in addressing such undesirable network configurations because the layer 2 heartbeats only provide information about the connectivity of NIC team members with one another, i.e., connected or disconnected. The layer 2 heartbeats do not provide information about where a connectivity break 72 may have occurred, what network devices are still accessible via a particular NIC team member, or which network segment should retain connectivity to the server 50.

In accordance with one embodiment of the present invention, a technique for addressing this incongruity is to provide an external network device 20, e.g., an echo node, on the network 12 which may be used to define the most desirable network segment in the event of a connectivity break 72. The presence of the external network device 20 on a network segment may be used to designate that network segment as one that should retain connectivity to the server 50 in preference to other network segments. One way in which connectivity between the external network device 20 and the server 50 may be maintained is to utilize layer 3 heartbeats, i.e., heartbeat frames that test the connectivity between each member of the NIC team 24 and the external network device 20, such as a router running TCP/IP. Such layer 3 heartbeat frames typically include not only a MAC address but also a protocol address, such as an IP or IPX address, for the external network device 20.

Figure 4:
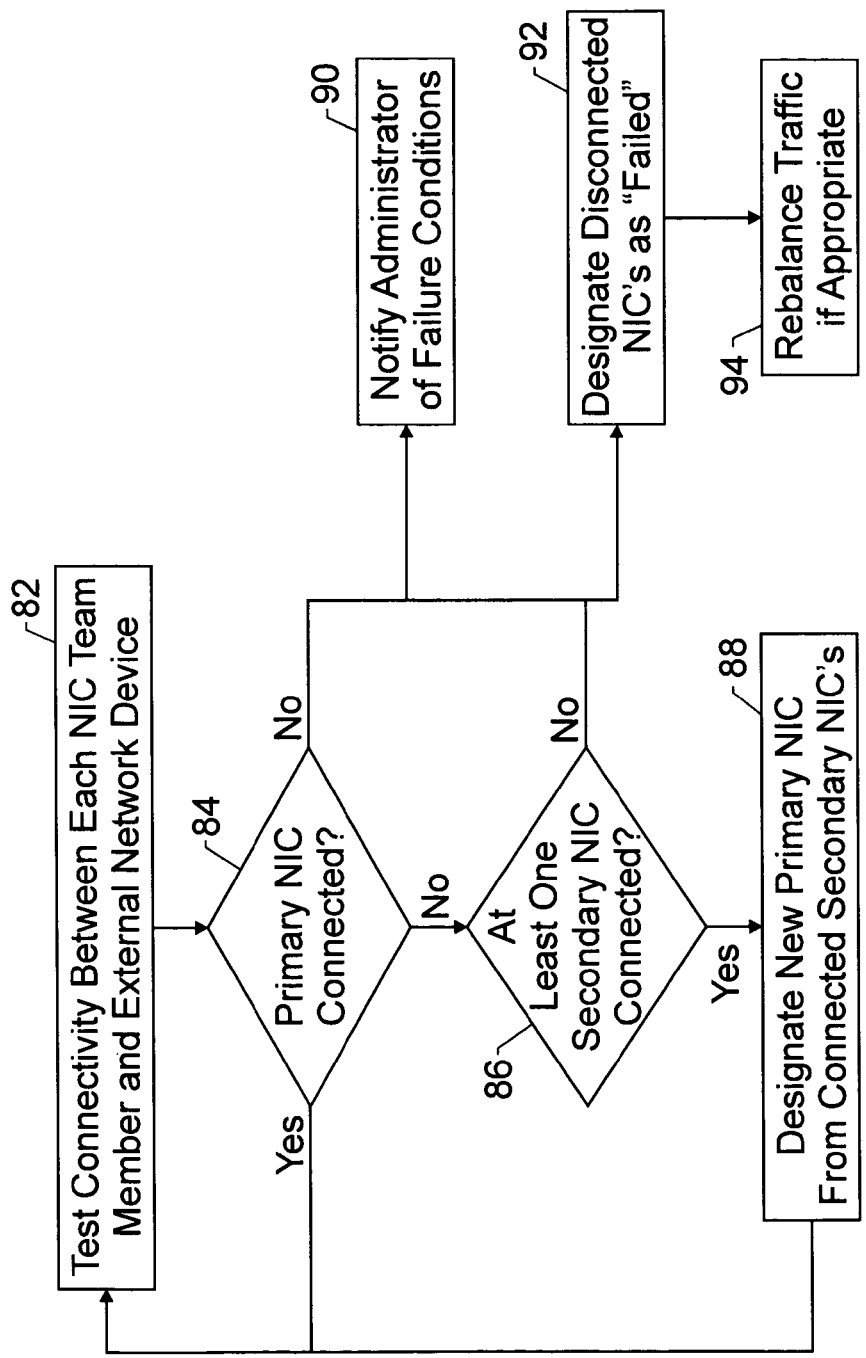
FIG. 4 is a flow chart depicting a technique for connection monitoring and recovery, in accordance with aspects of the present invention.

One example of this technique is described in FIG. 4. As depicted at block 82, the connectivity between each member of the NIC team 24 and the external network device 20 is tested. If the primary NIC 14 retains connectivity to the external network device 20, as determined at decision block 84, no action is taken and the connectivity tests may be repeated at a designated interval.

If, however, the primary NIC 14 loses connectivity to the external network device 20, a determination may then be made whether one or more of the secondary NICs 16 and 18 has retained connectivity to the external network device 20, as determined at decision block 86. If neither the primary NIC 14 nor the secondary NICs 16 and 18 retain connectivity to the external network device 20, the intermediate driver 30 may proceed to test for other secondary external network devices that may be designated on the network 12 to identify network segments with which connectivity is desired. In this manner, a hierarchy of external network devices may be tested for connectivity with members of the NIC team 24 until some network segment of interest is found to be connected to a member of the NIC team.

However, if one or more of the secondary NICs 16 and 18 has retained connectivity to the primary external network device 20, one of the secondary NICs 16 and 18 that remains connected is designated as the new primary NIC and the primary NIC 14 is redesignated as a secondary NIC, as depicted at block 88. The designation of the new primary NIC may be based upon a preconfigured order of the secondary NICs 16 and 18, such as based on bandwidth or expansion slot order, may be based upon a situational variable, such as the order of response from the external network device 20, or may be arbitrary. Typically the designation of the new primary NIC may be performed automatically by the operation of the intermediate driver 30, however, other drivers or software may also be configured to perform the designation. Alternatively, an operator may perform the resignation via the configuration application 36.

Once a new primary NIC is designated, the cycle of testing between the members of the NIC team 24 and the external network device 20 may be resumed. As will be appreciated by those of ordinary skill in the art, in some cases one or more of the members of the NIC team 24 may be preferred as the primary NIC 14, such as for bandwidth or reliability reasons. If one or more members of the NIC team 24 is preferred as the primary NIC 14, the reestablishment of connectivity between a preferred NIC and the external network device 20 may result in another redesignation event if a non-preferred NIC was designated as primary due to a connectivity break 72. In the absence of such a NIC hierarchy or redesignation scheme, however, the new primary NIC will continue as primary until reconfigured by an operator or by the occurrence of a new connectivity break 72.

While a new primary NIC may be designated in response to the connectivity test, other actions may also be desirable. For example, in the event that the one or more members of the NIC team 24 do not have connectivity to the external network device 20, an administrator may be notified of these connectivity failures, as depicted at block 90. Similarly, the absence of connectivity between a NIC and the external network device 20 may result in the NIC being flagged or otherwise designated, such as in a table or other memory location accessible by the intermediate driver 30, as not having connectivity, as depicted at block 92. Depending on the mode of operation of the NIC team 24, such designations may result in rebalancing the network traffic handled by the members of the NIC team 24, as depicted at block 94, so that NIC team members with no connectivity are not used. Once connectivity is restored between a member of the NIC team 24 and the external network device 20, the flag or failure designation may be cleared and the member may be made available once again for load balancing or other functions.

Figure 5:
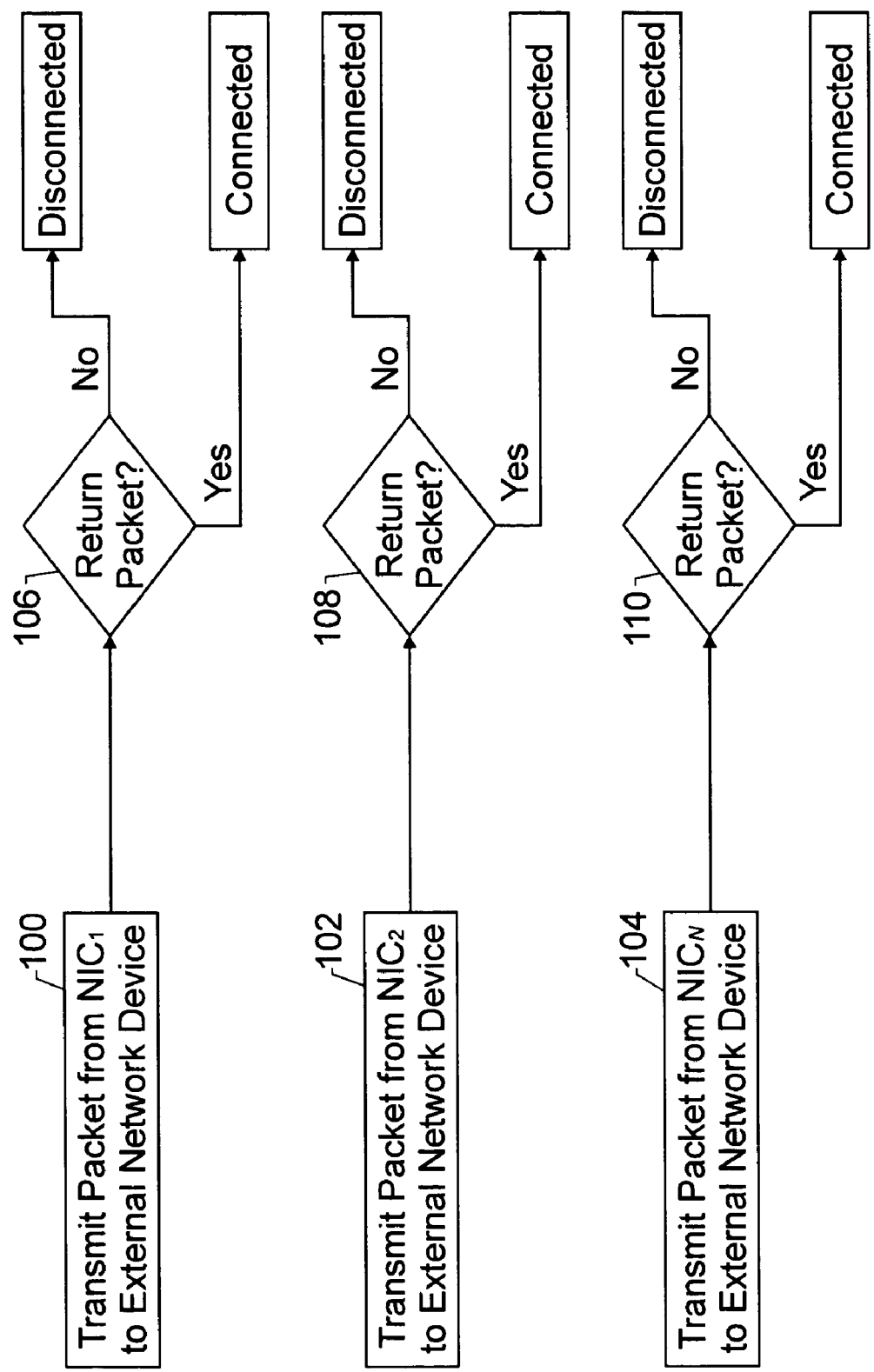
FIG. 5 is a flowchart depicting a technique for connection testing, in accordance with aspects of the present invention.

As will be appreciated by those of ordinary skill in the art, the preceding discussion presumes the ability to test the connectivity between the members of the NIC team 24 and the external network device 20. Referring now to FIG. 5, one technique for testing connectivity is described in detail. As depicted, each NIC 14, 16, and 18 of the NIC team 24 periodically transmits a request packet to the external network device 20, as depicted at blocks 100, 102, and 104. If the external network device 20 returns a response packet to the respective transmitting NIC, as determined at respective decision blocks 106, 108, and 110, the determination is made that the NIC is connected to the external network device 20. Failure to receive a return packet at the transmitting NIC is indicative of the lack of connectivity between the respective NIC and the external network device 20. As will be appreciated by those of ordinary skill in the art, the response packet is addressed to the MAC address of the transmitting NIC, as packets directed to the IP address of the NIC team 24 are sent to the MAC address for the team, and thereby to the primary NIC 14, which may or may not be the transmitting NIC.

To direct response packets to the NIC transmitting the layer 3 heartbeat, a common packet format may be utilized. For example, the request packet may be based, possibly with some modification, on the address resolution protocol (ARP) format, which is typically used to determine MAC addresses from IP addresses. For example, the layer 3 heartbeat transmitted by a NIC to the external network device 20, i.e., the request packet, may resemble an ARP request frame without an IP address for the transmitting NIC (NIC team members do not have individual IP addresses but do have individual MAC addresses). Because the request packet does not include an IP address for the transmitter, the external network device 20 will respond to the MAC address associated with the transmitting NIC, thereby circumventing the NIC designated as primary when appropriate. For example, an ARP request packet transmitted from a NIC (designated "A" for this example) to a Node (designated "B") may be formatted:

| Layer 2 | | | Layer 3 | | |
|---|---|---|---|---|---|
| Destination MAC = B | Source MAC = A | Destination MAC = B | Destination IP = .2 | Source MAC = A | Source IP = [Blank] |

The ARP response packet from the Node to the NIC would then be formatted:

| Layer 2 | | | Layer 3 | | |
|---|---|---|---|---|---|
| Destination MAC = A | Source MAC = B | Destination MAC = A | Destination IP = [Blank] | Source MAC = B | Source IP = .2 |

One benefit of using an ARP request frame modified in this manner is that it will provoke a suitable response from any external network device 20 running TCP/IP, i.e., it is not necessary to modify the external network device 20 or provide special software or drivers. The MAC address and IP address used to generate the request packets to the external network device 20 may be provided via the configuration application 36 of FIG. 1. In such an implementation, an operator or administrator may determine the external network device 20 that should retain network connectivity and provides the appropriate IP and MAC addresses for this device to the intermediate driver 30 via the configuration application 36.

Figure 6:
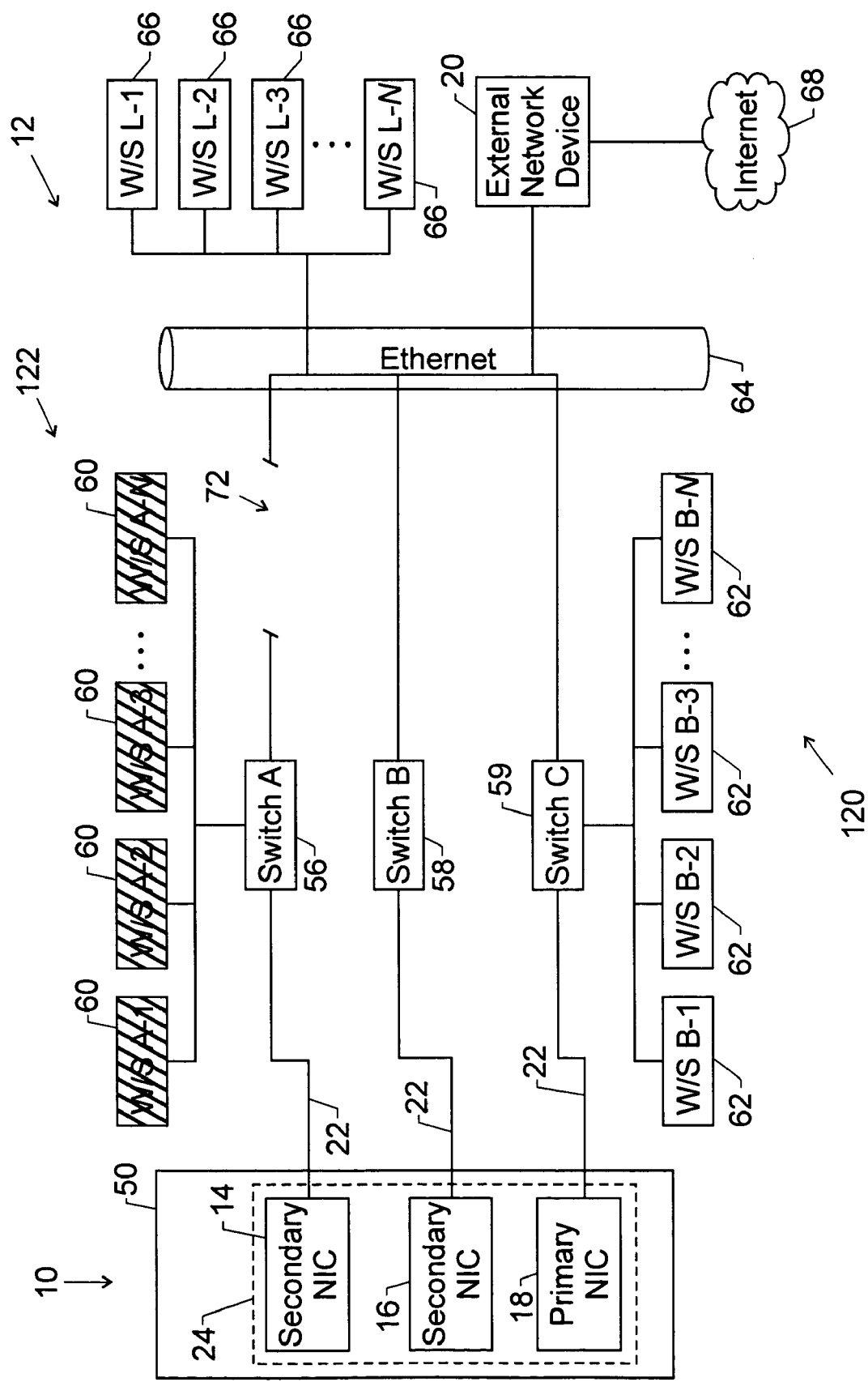
FIG. 6 is a block diagram depicting the exemplary computer network of FIG. 2 undergoing a connection disruption and partial recovery.

As a result of the connectivity testing and response processes described in FIGS. 4 and 5, a new active network segment 120 may result, which is connected to the new primary NIC 18 and includes the external network device 20, as depicted in FIG. 6. Conversely, a new inactive network segment 122 connected to the new secondary NIC 14 (which was formerly designated as the primary NIC) is also created. In this manner, connectivity to the NIC team 24 is restored for that network segment which includes the external network device 20, though connectivity between the server 50 and other network segments may be sacrificed. If the present technique is implemented automatically, such as by the intermediate driver 30, manual reconfiguration of the NIC team 24 by an administrator may be circumvented, allowing rapid recovery of desired network functionality.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for monitoring network connectivity, comprising the acts of:

transmitting a respective request packet from each network interface card (NIC) of a plurality of NICs in a NIC team to an external network device via different network segments to test connectivity of each network segment between the external network device and each respective NIC, each network segment being associated respectively and uniquely with one of the NICs of the NIC team, and each NIC having a different receive address, wherein:

the external network device comprises an echo node having an Internet Protocol (IP) Address identified in each request packet, the echo node being configured upon receiving a request packet from a respective NIC to generate a response packet uniquely and specifically addressed to the respective NIC and different from the request packet, the NIC team functions when not monitoring network connectivity as a virtual NIC communicating with the external device through a NIC of the plurality of NICs designated as a primary NIC, each of remaining NICs provide separate and redundant network connectivity, and the NIC team shares an Internet Protocol (IP) address;

receiving a respective response packet from the external network device at each respective NIC from which a respective request packet was received by the external network device; and if connectivity between the external network device and the primary NIC is not present and a response packet is not received from the external network device by the primary NIC, designating one of the remaining NICs as a new primary NIC.

2. The method as recited in claim 1, wherein each respective response packet is addressed to a media access control (MAC) address of the respective NIC.

3. The method as recited in claim 1, wherein each respective request packet comprises an address resolution protocol (ARP) request frame that does not include an IP address for the respective NIC.

4. The method as recited in claim 1, further comprising the act of:

designating one of the plurality of NICs as the primary NIC based upon the receipt of respective response packets by the NICs of the NIC team.

5. A method for monitoring network connectivity, comprising the acts of:

assessing the connectivity of respective network segments between a primary network interface card (NIC) and an external network device and between secondary NICs and the external network device by transmitting respective directed request packets from the primary and secondary NICs to the external network device over each network segment and determining whether respective response packets are received by the primary and second NICs, wherein:

a NIC team comprising the primary NIC and the secondary NICs function as a virtual NIC, each of the secondary NICs provide separate and redundant network connectivity, the NIC team shares an Internet Protocol (IP) address, and the external network device is adapted to generate a respective response packet for each received request packet and to transmit the generated response packet only to the respective primary or secondary NIC that transmitted the received request packet, each respective response packet being uniquely addressed to the respective primary or secondary NIC that transmitted the received request packet, designating a new primary NIC from among the secondary NICs if the primary NIC is not connected to the external network device as evidenced by the failure of the primary NIC to receive a response packet from the external network device after transmitting a request packet to the external network device; and flagging the primary NIC to indicate lack of connectivity.

6. The method as recited in claim 5, further comprising the act of:

designating at least one of the primary NIC and the secondary NICs as disconnected from the external network device based on the results of the assessment.

7. The method as recited in claim 5, further comprising the act of:

providing a notification that at least one of the primary NIC and the secondary NICs are disconnected from the external network device based on the results of the assessment.

8. The method as recited in claim 5, wherein each respective response packet is addressed to a media access control (MAC) address corresponding uniquely to the primary or secondary NIC that transmitted the received request packet being responded to by the external network device.

9. The method as recited in claim 5, wherein each request packet comprises an address resolution protocol (ARP) request frame that does not include an IP address for the primary or secondary NIC that transmitted the received request packet being responded to by the external network device.

10. A manufacture, comprising:

a computer-readable medium having executable instructions stored thereon, the executable instructions when executed causing a device to:

cause each network interface card (NIC) of a NIC team to transmit a request packet to an external network device over a different network segment connected to the external network device, wherein:

each request packet includes an Internet Protocol (IP) address uniquely associated with the external network device;

the external network device is adapted to generate a respective response packet for each received request packet, each response packet being addressed solely to the NIC that transmitted the request packet being responded to and being transmitted over the same network segment on which the corresponding request packet was received;

the NIC team functions when not monitoring network connectivity as a virtual NIC communicating with the external device through a NIC of the plurality of NICs designated as a primary NIC, each of remaining NICs provide separate and redundant network connectivity with the external network device, and the NIC team shares an Internet Protocol (IP) address;

determine whether each NIC receives a respective response packet from the external device in response to the respective request packet; and if no response packet is received by the primary NIC, designate one of the remaining NICs as a new primary NIC.

11. The manufacture as recited in claim 10, wherein each request packet comprises an address resolution protocol (ARP) request frame that does not include an IP address for the NIC team or any NIC of the NIC team.

12. The manufacture as recited in claim 10, wherein the executable instructions further cause the device to:

designate a primary NIC for the NIC team based upon the receipt of response packets.

13. A manufacture, comprising:

a computer-readable medium having executable instructions stored thereon, the executable instructions when executed causing a device to:

assess connectivity of respective network segments between a primary network interface card (NIC) and an external network device and between secondary NICs and the external network device by transmitting respective directed request packets from the primary and secondary NICs to the external network device over each network segment and determining whether respective response packets are received by the primary and secondary NICs, wherein:

a NIC team comprising the primary NIC and the secondary NICs function as a virtual NIC, each of the secondary NICs provide separate and redundant network connectivity with the external network device, the NIC team shares an Internet Protocol (IP) address, and the external network device is adapted to generate a respective response packet for each received request packet and to transmit the generated response packet only to the respective primary or secondary NIC that transmitted the received request packet, each respective response packet being uniquely addressed to the respective primary or secondary NIC that transmitted the received request packet;

designate a new primary NIC if the primary NIC is not connected to the external network device as evidenced by the failure of the primary NIC to receive a response packet from the external network device after transmitting a request packet to the external network device; and flag the primary NIC to indicate lack of connectivity.

14. The manufacture recited in claim 13, wherein the external network device comprises a first external network device, and wherein the executable instructions further cause the device to assess the connectivity between the primary NIC and a second external network device and between the secondary NICs and the second external network device if the primary NIC and the secondary NICs are not connected to the first external network device.

15. The manufacture recited in claim 13, wherein the executable instructions further cause the device to designate at least one of the primary NIC and the secondary NICs as disconnected based on the results of the assessment.

16. The manufacture recited in claim 13, wherein the executable instructions further cause the device to provide a notification that at least one of the primary NIC and the secondary NICs are disconnected from the external network device based on the results of the assessment.

17. A computer system, comprising:

means for transmitting a respective request packet from each network interface card (NIC) of a plurality of NICs in a NIC team to an external network device via different network segments to test connectivity of each network segment between the external network device and each respective NIC, each network segment being associated respectively and uniquely with one of the NICs of the NIC team, and each NIC having a different receive address, wherein:

the external network device comprises an echo node having an Internet Protocol (IP) Address identified in each request packet, the echo node being configured upon receiving a request packet from a respective NIC to generate a response packet uniquely and specifically addressed to the respective NIC and different from the request packet, the NIC team functions when not monitoring network connectivity as a virtual NIC communicating with the external device through a NIC of the plurality of NICs designated as a primary NIC, each of remaining NICs provide separate and redundant network connectivity, and the NIC team shares an Internet Protocol (IP) address;

means for receiving a respective response packet from the external network device at each respective NIC from which a respective request packet was received by the external network device; and means for designating one of the remaining NICs as a new primary NIC if connectivity between the external network device and the primary NIC is not present and a response packet is not received from the external network device by the primary NIC.

18. A computer system, comprising:

means for assessing the connectivity of respective network segments between a primary network interface card (NIC) and an external network device and between secondary NICs and the external network device by transmitting respective directed request packets from the primary and secondary NICs to the external network device over each network segment and determining whether respective response packets are received by the primary and secondary NICs, wherein:

a NIC team comprising the primary NIC and the secondary NICs function as a virtual NIC, each of the secondary NICs provide separate and redundant network connectivity the NIC team shares an Internet Protocol (IP) address; and the external network device is adapted to generate a respective response packet for each received request packet and to transmit the generated response packet only to the respective primary or secondary NIC that transmitted the received request packet, each respective response packet being uniquely addressed to the respective primary or secondary NIC that transmitted the received request packet, means for designating a new primary NIC from among the secondary NICs if the primary NIC is not connected to the external network device as evidenced by the failure of the primary NIC to receive a response packet from the external network device after transmitting a request packet to the external network device; and means for flagging the primary NIC to indicate lack of connectivity.

19. A computer system, comprising:

a network interface card (NIC) team comprising at least two NICs, wherein each NIC is configured to transmit a succession of request packets to an external network device and to receive a response packet for each request packet reaching the external network device via different network segments to test connectivity of each network segment between the external network device and each respective NIC, each network segment being associated respectively and uniquely with one of the NICs, and each NIC having a unique and different receive address for inclusion in response packets, wherein:

the external network device comprises an echo node having an Internet Protocol (IP) Address identified in each request packet, the echo node being configured upon receiving a request packet from a respective NIC to generate a response packet uniquely and specifically addressed to the respective NIC and different from the request packet, the NIC team functions as a virtual NIC when not receiving response packets from the external network device, each of remaining NICs provide separate and redundant network connectivity, and the NIC team shares an Internet Protocol (IP) address; and wherein one of the remaining NICs is designated as a new primary NIC if the primary NIC is determined not to be connected to the external network device.

20. The computer system as recited in claim 19, further comprising:

an intermediate driver configured to designate a primary NIC for the NIC team based upon the transmission of request packets and the receipt of response packets by the at least two NICs.

21. The computer system as recited in claim 19, wherein each response packet is addressed to the media access control (MAC) address of the respective transmitting NIC.

22. The method of claim 1, further comprising the act of:

designating one of the plurality of NICs as the primary NIC for the NIC team based upon the order of a plurality of expansion slots configured to receive the NICs, the network bandwidth of each of the plurality of NICs, a preconfigured order of the plurality of NICs, the order of response of each of the plurality of NICs from a set of the external network, and a combination thereof.

* * * * *

UNITED STATES PATENT AND TRADEMARK OFFICE
CERTIFICATE OF CORRECTION

PATENT NO. : 7,639,624 B2
APPLICATION NO. : 10/898399
DATED : December 29, 2009
INVENTOR(S) : Michael Sean McGee et al.

It is certified that error appears in the above-identified patent and that said Letters Patent is hereby corrected as shown below:

On the Title page, in field (75), Inventors, in column 1, line 1, delete "Michel" and insert -- Michael --, therefor.

In column 11, line 45, in Claim 18, after "connectivity" insert -- , --.

Signed and Sealed this

Twentieth Day of April, 2010

David J. Kappos
*Director of the United States Patent and Trademark Office*